United States Patent
O'Sullivan et al.

(10) Patent No.: US 7,636,344 B2
(45) Date of Patent: Dec. 22, 2009

(54) DIVERSITY TRANSCEIVER FOR A WIRELESS LOCAL AREA NETWORK

(75) Inventors: John O'Sullivan, Ermington (AU); Neil Weste, Castle Hill (AU)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 11/421,204

(22) Filed: May 31, 2006

(65) Prior Publication Data

US 2007/0049348 A1    Mar. 1, 2007

Related U.S. Application Data

(62) Division of application No. 09/953,461, filed on Sep. 14, 2001, now Pat. No. 7,110,381.

(60) Provisional application No. 60/277,370, filed on Mar. 19, 2001, provisional application No. 60/283,609, filed on Apr. 13, 2001.

(51) Int. Cl.
*H04L 12/50*    (2006.01)

(52) U.S. Cl. ...................................... 370/338

(58) Field of Classification Search ........................ None
See application file for complete search history.

(56) References Cited

U.S. PATENT DOCUMENTS

| | | | | |
|---|---|---|---|---|
| 5,371,734 A * | 12/1994 | Fischer | ...................... | 370/311 |
| 5,377,133 A | 12/1994 | Riggle et al. | ................. | 708/524 |
| 5,487,069 A | 1/1996 | O'Sullivan et al. | ........... | 370/404 |
| 5,596,604 A | 1/1997 | Cioffi et al. | ................... | 375/260 |
| 5,694,417 A | 12/1997 | Andren et al. | ............... | 375/150 |
| 5,712,870 A | 1/1998 | Petrick | ........................ | 375/147 |
| 5,917,872 A | 6/1999 | Ching | .......................... | 375/369 |
| 5,923,761 A | 7/1999 | Lodenius | ...................... | 380/49 |
| 5,949,793 A | 9/1999 | Bossard et al. | .............. | 370/487 |
| 5,953,636 A | 9/1999 | Keate et al. | ................... | 455/3.2 |
| 6,018,651 A | 1/2000 | Bruckert et al. | ........... | 455/277.1 |
| 6,100,767 A | 8/2000 | Sumi | ............................ | 331/11 |
| 6,130,922 A | 10/2000 | Stott et al. | ................... | 375/344 |
| 6,229,486 B1 | 5/2001 | Krile | ........................... | 343/700 |
| 6,317,411 B1 | 11/2001 | Whinnett et al. | ............. | 370/204 |
| 6,351,499 B1 | 2/2002 | Paulraj et al. | ................ | 375/267 |
| 6,377,782 B1 * | 4/2002 | Bishop et al. | ............... | 455/3.01 |
| 6,477,210 B2 | 11/2002 | Chuang et al. | ............... | 375/340 |
| 6,526,264 B2 * | 2/2003 | Sugar et al. | .................... | 455/84 |
| 6,615,388 B1 | 9/2003 | Takamichi | ................... | 714/795 |
| 6,661,999 B1 | 12/2003 | Johnson et al. | ........... | 455/127.1 |
| 6,680,980 B1 | 1/2004 | Ashley et al. | ................ | 375/265 |

(Continued)

OTHER PUBLICATIONS

Weste et al, VLSI for OFDM, IEEE, pp. 127-131, 1998.*

(Continued)

*Primary Examiner*—Frank Duong
(74) *Attorney, Agent, or Firm*—Dov Rosenfeld; INVENTEK

(57) ABSTRACT

A wireless local area network system comprises a 5.0+ GHz radio transceiver with two receiving antennas and one transmitting antenna. A transmitter power amplifier output is connected to the transmitting antenna through a 6-8 pole filter to control spurious signal output. Each receiving antenna is fitted with its own low-noise amplifier followed by a simple bandpass filter. Each bandpass filter feeds a diversity switch with a single output to a single receiver. The radio system constitutes a physical-layer (PHY) part of a wireless local-area network.

20 Claims, 3 Drawing Sheets

U.S. PATENT DOCUMENTS

| | | | |
|---|---|---|---|
| 6,680,986 B1 | 1/2004 | Hemmati | 375/341 |
| 6,700,865 B1 * | 3/2004 | Yamamoto et al. | 370/208 |
| 6,870,808 B1 | 3/2005 | Liu et al. | 370/203 |
| 7,054,296 B1 | 5/2006 | Sorrells et al. | 370/338 |

OTHER PUBLICATIONS

Weste et al, VLSI for Multimedia U-NII WLANs, IEEE, pp. 585-587, 1998.*

Osgood et al, A Flexible Approach to 5GHZ U-NII Band WLAN Radio Environment, pp. 175-180, 1997, downloadable at http://www.elec.mq.edu.au/cnerf/papers/1996-1998.htm.*

McGibney et al, Implementation of a High Performance Wireless LAN, IEEE, pp. 645-650, 1994.*

Skellern et al, Broadband U-NII Wireless Data, IEEE, 6 pages, 1997.*

Liu et al, Advanced Low-Complexity HIPERLAN Receiver Using Combined Antenna Switching Diversity and Simple Equalizer, IEEE, 5 pages, 1997.*

Office Action for U.S. Appl. No. 11/278,239 mailed Dec. 3, 2007.

J. C. Rudell, J.J. Ou, R. S. Narayanaswami, G. Chien, J. A. Weldon, L.Lin, K.C. Tsai, L. Tee, K. Khoo, D. Au, T. Robinson, D. Gerna, M. Otsuka, P. R. Gray. "Recent Developments in High Integration Multi-Standard CMOS Transceivers for Personal Communication Systems." *Proceedings of the 1998 International Symposium on Low Power Electronics and Design*. Aug. 10-12, 1998, Monterey, California, United States.

Foschini et al., "On Limits of Wireless Communications in a Fading Environment when Using Multiple Antennas," Kluwer Academic Publisher, pp. 311-335, 19998.

* cited by examiner

DIVERSITY TRANSCEIVER FOR A WIRELESS LOCAL AREA NETWORK

RELATED PATENT APPLICATIONS

This application is a division of U.S. patent application Ser. No. 09/953,461 filed Sep. 14, 2001 now U.S. Pat. No. 7,110,381 and titled DIVERSITY TRANSCEIVER FOR A WIRELESS LOCAL AREA NETWORK, assigned to the assignee of the present invention. U.S. application Ser. No. 09/953,461 is incorporated herein by reference.

U.S. application Ser. No. 09/953,461 claims priority of U.S. provisional patent applications, Ser. No. 60/277,370 entitled SYSTEM USING SINGLE CHIP WIRELESS LAN MODEM AND SINGLE CHIP RADIO TRANSCEIVER AND APPARATI, METHODS, AND SOFTWARE PRODUCTS USED THEREIN OR THEREWITH, filed Mar. 19, 2001; and also, Ser. No. 60/283,609 entitled WIRELESS COMMUNICATION SYSTEM, filed Apr. 13, 2001. Both are incorporated herein by reference.

BACKGROUND OF THE INVENTION

1. Field of the Invention

The present invention relates to radio transceivers, and more particularly to combinations of receiving antennas and transmitting antennas that reduce signal losses that occur before the first low-noise amplification or after the last power amplification stage.

2. Description of Related Art

Radio transceivers that share one antenna between the receiver and transmitter generally rely on a transmit/receive (T/R) switch to multiplex the antenna. This, of course presupposes half-duplex operation where only the receiver or transmitter is being used at any one time.

Many radio receiver applications are such that they must reliably receive and demodulate very weak signals. The radio field signal strength can drop so low in some applications that special low-noise amplifier (LNA) modules are integrated with the antenna assembly. A typical such application is the microwave patch antennas used in global positioning system (GPS) navigation receivers. Of course, GPS receivers do not have the complication of an included transmitter or T/R switch. Similarly, losses between the power amplification and the antennas due to diversity and T/R switches limits the available transmitted power and impacts on the transmission reliability.

Antenna diversity is used in some modern systems to take advantage of the fact that even closely positioned antennas can experience very different induced signal levels. This often requires a "diversity switch" that can be controlled to select one antenna over the other.

In radio transceiver systems that operate in the 5.0+ GHz spectrum, e.g., radio transceivers that conform to the IEEE 802.11 standard, a typical T/R switch and diversity switch can each insert approximately 1.5 dB of signal loss. At the field strengths that wireless local area networks operate in, their receivers can ill-afford such losses because they come before the earliest point an LNA can be placed. Another approximately 2.0 dB of loss is typically introduced when relatively complex bandpass filters, e.g., bandpass filters with 3 or more poles are added between the antenna diversity switch and T/R switch to eliminate spurious sidebands from the transmitted signal. Such a filter sits in the received signal path too. Altogether, such losses in conventional designs can add up to approximately 5.0 dB for each of the transmitter and receiver to the antenna.

Local area networks (LAN's) are conventionally interconnected by twisted-wire pairs and shielded cables. A whole class of mobile computing has emerged that depends on various kinds of wireless communication. Amateur radios and cellphones have long been used to connect computer browsers to the Internet, and now wireless devices have been used to build LAN's within a room or building. Better frequency bands and higher allowable power will allow LAN clients to roam around in cities and along highways.

An industry-standard, the IEEE 802.11 specification, defines the protocol for two types of networks, ad-hoc and client/server networks. An ad-hoc network is a simple network where communications are established between multiple stations in a given coverage area without the use of an access point or server. The standard specifies the etiquette that each station must observe so that they all have fair access to the wireless media. It provides methods for arbitrating requests to use the media to ensure that throughput is maximized for all of the users in the base service set. The client/server network uses an access point that controls the allocation of transmit time for all stations and allows mobile stations to roam from cell to cell. The access point is used to handle traffic from the mobile radio to the wired or wireless backbone of the client/server network. This arrangement allows for point coordination of all of the stations in the basic service area and ensures proper handling of the data traffic. The access point routes data between the stations and other wireless stations or to and from the network server. Typically wireless local area networks (WLAN's) controlled by a central access point will provide better throughput performance.

The license-free national information structure (U-NII) radio spectrum bands in the United States are assigned to 5.15-5.25, 5.25-5.35, and 5.725-5.825 GHz, and are ideal for wireless ad-hoc LAN communication use. The IEEE-802.11 a protocol prescribes using a training sequence comprising a preamble that enables a receiver to lock on to the carrier and helps get the data demodulation going.

The IEEE-802.11a burst transmission begins with a two-part preamble, e.g., a short preamble and a long-preamble. The exact boundary point between the short and long preambles is important to the receiver's subsequent demodulation process, and must be found quickly in an environment where the carrier frequency and code phase are uncertain. Signal fading, multipath interference, and channel distortion can make signal acquisition less certain in a typical receiver.

SUMMARY OF THE INVENTION

An object of the present invention is to provide a wireless local area network.

Another object of the present invention is to improve radio reception in a wireless local area network.

A further object of the present invention is to provide a more reliable radio transceiver.

Briefly, a transceiver embodiment of the present invention for operating in a wireless local area network comprises a 5.0+ GHz radio transceiver with reduced losses comprised of two receiving antennas and one transmitting antenna or one receiving antenna and two transmit antennas. A transmitter power amplifier output is connected to the transmitting antenna through a bandpass filter to control spurious signal output. Each receiving antenna is fitted with its own low-noise amplifier followed by a simple bandpass filter. Each bandpass filter feeds a diversity switch with a single output to a single receiver. The radio transceiver constitutes a physical-layer (PHY) part of a wireless local-area network.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
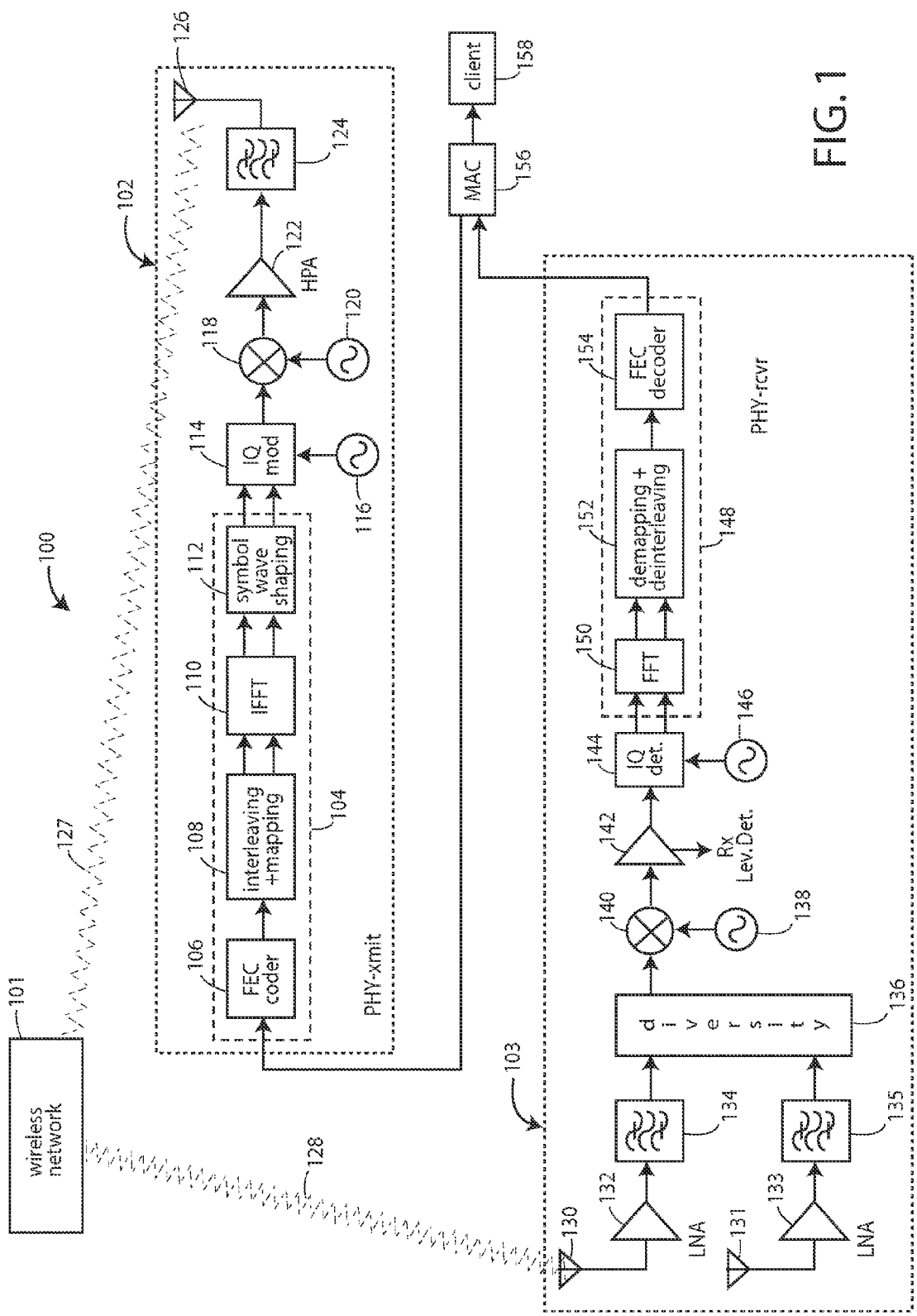
FIG. 1 is a functional block diagram of a first wireless local area network system embodiment of the present invention in which there are two receiving antennas connected to a diversity switch.

FIG. 1 illustrates a wireless local area network (LAN) system embodiment of the present invention, and referred to herein by the general reference numeral 100. Such is preferably based on orthogonal frequency division multiplexing (OFDM), and quadrature phase shift keying (QPSK) and quadrature amplitude modulation (QAM) of signals transmitted in the 5 GHz frequency spectrum. The wireless LAN system 100 includes a wireless network 101 that may be connected to the Internet, a PHY-transmitter 102, and a PHY-receiver 103. Such all preferably conform to the IEEE-802.11a Specification for a physical layer (PHY) interface in a wireless local area network which allows mobile clients on an ad-hoc basis.

In a typical embodiment, the transmitter 102 comprises a one or more digital signal processing elements (DSP) 104 which implement a forward error correction (FEC) coder 106, an interleaving and mapping process 108, an inverse fast Fourier transform processor 110, and a symbol wave shaper 112. The DSP 104 outputs in-phase (I) and quadrature-phase (Q) signals that are input to an IQ modulator 114 driven by a local oscillator 116. The modulated output is sent to a mixer 118 for up-conversion to the 5 GHz band. A second local oscillator 120 provides the necessary carrier frequency. A high power amplifier (HPA) 122 has any spurious sidebands removed by a bandpass filter 124 before being output to a transmitter antenna 126. Such filter 124 is necessarily a complex type, e.g., a multi-pole filter that in one embodiment has as few as 2-3 poles, and in another has 6-8 poles. A radio up-link 127 is received by the wireless network 101, and communicates Internet traffic, for example. In general, the transmitter 102 can be implemented with conventional methods and components. One embodiment is a transmitter part of a transceiver integrated circuit implemented in CMOS, with one or more external components, e.g., the complex bandpass filter.

Conventional practice puts diversity and transmit switching before a single LNA. By ensuring that the transmit antenna to receive antenna isolation is better than, for example, 30 dB and that the LNA power handling limit is better than about −10 dBm, then transmit power levels of about 10 dBm can be handled with the present invention. The advantage is the elimination of these switching losses.

In alternative transmitter embodiments of the present invention, two power amplifiers are used with a single diversity switch in front of the amplifiers. Thus the diversity switch losses do not detract from the achievable power output. Only one such power amplifier has its power switched on before transmission, to save overall power consumption. This is best done using a gradual, i.e., modulated switch-on, e.g., using a ramp function as described in co-pending U.S. patent application Ser. No. 09/877,398 to Adams, et al., filed Jun. 8, 2001, and assigned to the assignee of the present invention.

The receiver 103 receives a radio down-link 128 that is typically transmitted in bursts. Each burst is begun with a training sequence, e.g., a short and long preamble. In one embodiment, the receiver 103 includes at least two receiver antennas 130 and 131 each followed by a low-noise amplifier (LNA) 132 and 133. The antennas are preferably separated by at least one-half wavelength.

A pair of bandpass filters 134 and 135 precede a diversity switch 136. These are typically not the more complex 6-8 pole types needed by the transmitter. Insertion losses in filters 134 and 135 range 0.5-0.6 dB, and insertion loss through the diversity switch 136 is about 1.5 dB. Critically, both these losses occur after LNA 132 and 133.

In latter stages of the receiver 103, measurements are made on the received signals to decide whether diversity switch 136 should select signals from antenna 130 or antenna 131. The physical diversity of the two antennas will often cause one to have a better quality view of radio down-link 128.

In situations with significant multipath in the transmission path from transmitter to receiver, two antennas separated by as little as one half wavelength at one end or the other will suffer different amounts of signal fading. For Rayleigh faded signals corresponding to a large number of multiple paths, this means that 3 dB or more average improvement may typically be achieved by selecting the best antenna on transmit or, in the case of receive diversity, best antenna on receive, or, in the case of transmit and receive diversity, the best antenna on both.

A local oscillator 138 and a first mixer 140 produce an intermediate frequency (IF). An automatic gain control (AGC) amplifier 142 smoothes out signal-strength variations and drives an IQ-detector 144. A second local oscillator 146 provides the carrier necessary to derive the I and Q samples. Automatic frequency control (AFC) clock recovery can be skipped if frequency offset errors are corrected in later digital processing. One or more receiver signal processing elements (receiver-DSP 148) implement a fast Fourier transform process 150, a demapping and deinterleaving process 152, and an FEC decoder 154. The receiver-DSP 148 further includes the necessary digital logic needed for carrier frequency offset determination and correction. The higher levels of a mobile, computer-network client are represented by a media access controller (MAC) 156 and a client agent software 158.

Figure 2:
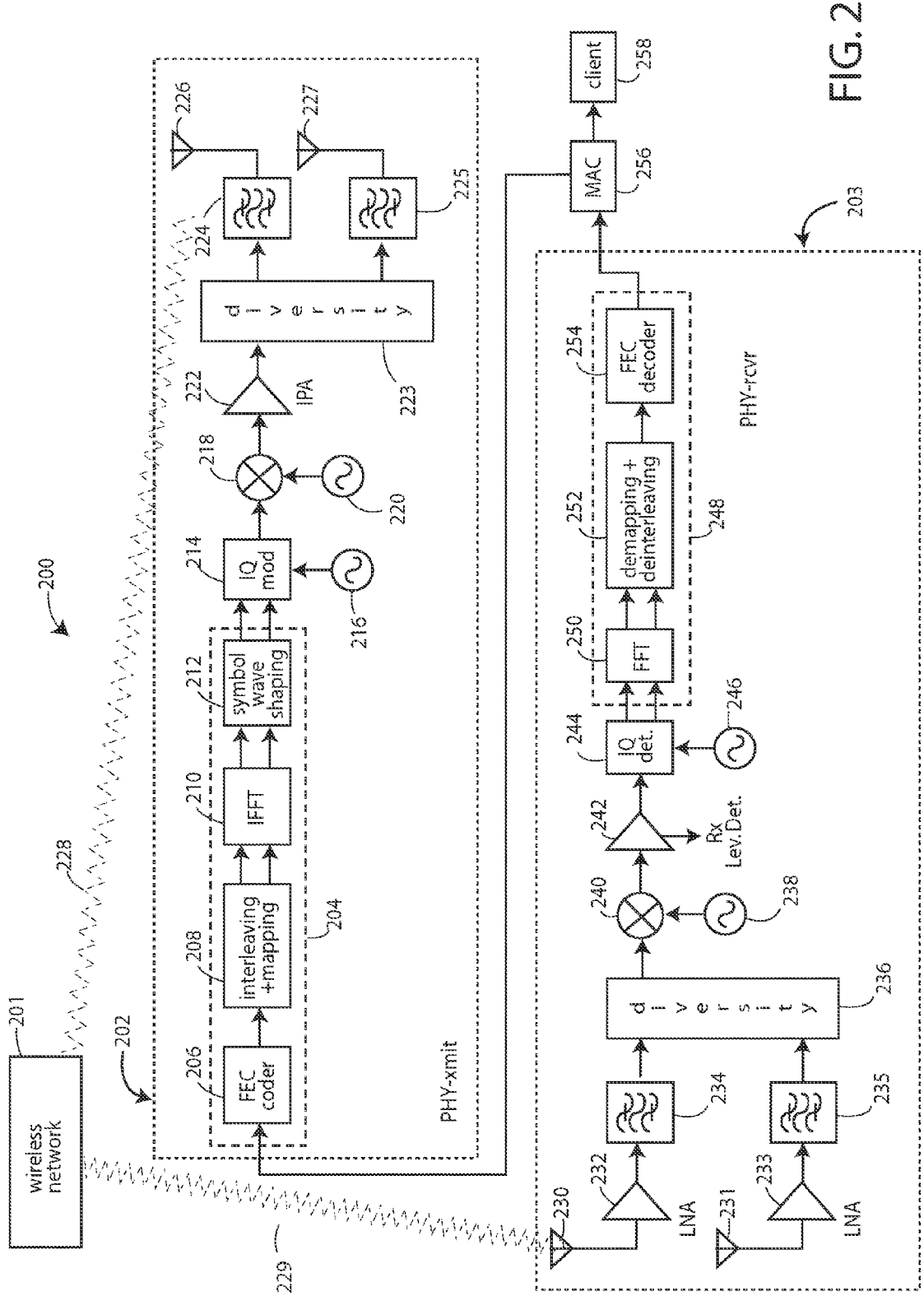
FIG. 2 is a functional block diagram of a second wireless local area network system embodiment of the present invention in which the transmitter is connected to two antennas through a diversity switch.

FIG. 2 illustrates another wireless local area network (LAN) system embodiment of the present invention, and is referred to herein by the general reference numeral 200. Such is also based on orthogonal frequency division multiplexing (OFDM), and modulation of signals, e.g., quadrature phase shift keying (QPSK) of signals transmitted in the 5 GHz frequency spectrum. As in system 100, the wireless LAN system 200 includes a wireless computer-data network 201 that may be connected to the Internet, a PHY-transmitter 202 with antenna diversity, and a PHY-receiver 203.

In a typical embodiment, the transmitter 202 comprises a digital signal processor (DSP) 204 which implements a forward error correction (FEC) coder 206, an interleaving and mapping process 208, an inverse fast Fourier transform processor 210, and a symbol wave shaper 212. The DSP 204 outputs in-phase (I) and quadrature-phase (Q) signals that are input to an IQ modulator 214 driven by a local oscillator 216. The modulated output is sent to a mixer 218 for up-conversion to the 5 GHz band. A second local oscillator 220 provides the necessary carrier frequency.

A high power amplifier (HPA) 222 is connected through an antenna-diversity switch 223. Such allows a test transmission to be made using one transmitter antenna, and if no remote response is elicited from the transmission, then a switch is made to transmit from another antenna. The assumption is that the slight difference in diversity may be enough to get the transmitted signal to the intended receivers.

The two outputs of the diversity switch 223 have any spurious sidebands removed by a filter 224 or 225 before being output to a corresponding transmitter antenna 226 or 227. Such filter 224 is necessarily a relatively complex type, e.g., a multi-pole one with as few as 2-3 and as many as 6-8, or even more poles. A radio up-link 228 is received by the wireless network 201, and communicates Internet traffic, for example.

The receiver 203 receives a radio down-link 229 that is typically transmitted in bursts. The receiver 203 includes at least two receiver antennas 230 and 231 each followed by a low-noise amplifier (LNA) 232 and 233. A pair of bandpass filters 234 and 235 precede a diversity switch 236. These are typically not the relatively complex multi-pole types needed by the transmitter. Insertion losses in filters 234 and 235 range 0.5-0.6 dB, and insertion loss through the diversity switch 236 is about 1.5 dB. Critically, both these losses occur after LNA 232 or 233.

Alternatively, receiver 203 uses only a single antenna 230, a single LNA 232, a single bandpass filter 234, and no diversity switch. The transmitter antenna diversity is relied on more heavily in such situation.

In latter stages of the receiver 203, measurements are made on the received signals to decide whether diversity switch 236 should select signals from antenna 230 or antenna 231. The physical diversity of the two antennas will often cause one to have a better quality view of radio down-link 229.

A local oscillator 238 and a first mixer 240 produce an intermediate frequency (IF). An automatic gain control (AGC) amplifier 242 smoothes out signal-strength variations and drives an IQ-detector 244. A second local oscillator 246 provides the carrier necessary to derive the I and Q samples. Automatic frequency control (AFC) clock recovery can be skipped if frequency offset errors are corrected in later digital processing. A receiver-DSP 248 comprises a fast Fourier transform process 250, a demapping and deinterleaving process 252, and an FEC decoder 254. The receiver-DSP 248 further includes the necessary digital logic needed for carrier frequency offset determination and correction.

The higher levels of a mobile, computer-network client are represented by a media access controller (MAC) 256 and a client agent software 258.

Figure 3:
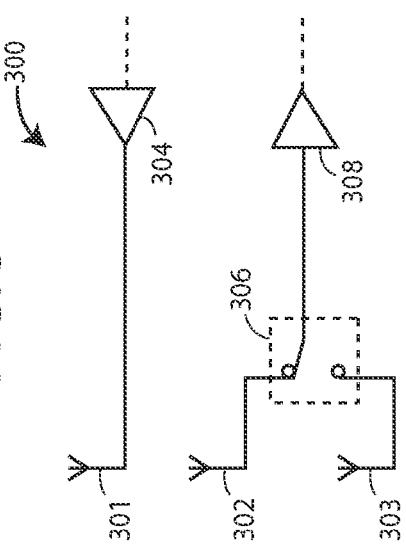
FIG. 3 is a schematic diagram of a receiver antenna diversity arrangement that requires no T/R switch in an alternative embodiment of the present invention.

FIG. 3 represents a receiver antenna diversity arrangement 300 that requires no T/R switch in an alternative embodiment of the present invention. A set of three antennas 301-303 are physically diversified. Antenna 301 is a transmit antenna driven by a power amplifier 304. Antennas 302 and 303 are receive antennas that are multiplexed through by a receive-diversity switch 306 to a low-noise amplifier (LNA) 308.

Figure 4:
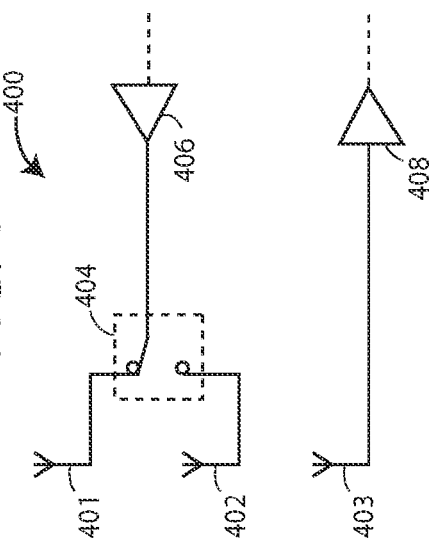
FIG. 4 is a schematic diagram of a transmitter antenna diversity arrangement that requires no T/R switch in another alternative embodiment of the present invention.

FIG. 4 represents a transmitter antenna diversity arrangement 400 that requires no T/R switch in another alternative embodiment of the present invention. A set of three antennas 401-403 include two receive antennas 401 and 402 connected to a transmit-diversity switch 404. A power amplifier 406 is selectively connected to antennas 401 and 402. A low-noise amplifier (LNA) 408 receives its signals from antenna 403.

Figure 5:
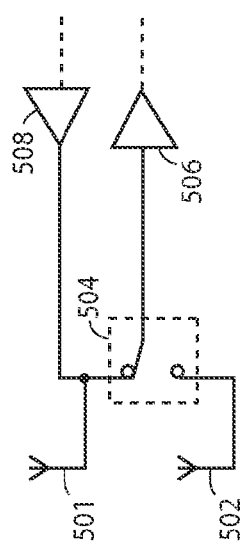
FIG. 5 is a schematic diagram of a receive-antenna diversity arrangement that requires no T/R switch and uses only two antennas in an alternative embodiment of the present invention.

FIG. 5 represents a receive-antenna diversity arrangement 500 that requires no T/R switch and uses only two antennas 501 and 502 in an alternative embodiment of the present invention. A receive-diversity switch 504 multiplexes the two antennas to a low-noise amplifier (LNA) 506. A power amplifier 508 drives only antenna 501.

Figure 6:
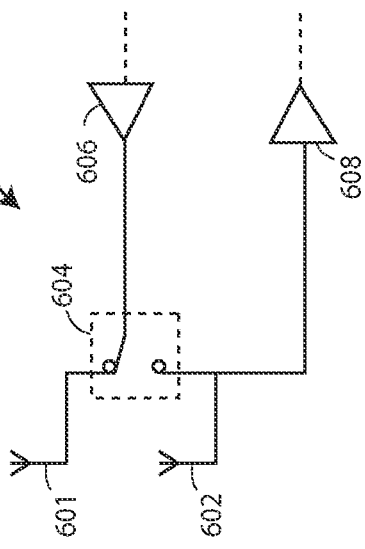
FIG. 6 is a schematic diagram of a transmit-antenna diversity arrangement that requires no T/R switch and uses only two antennas in another alternative embodiment of the present invention.

FIG. 6 represents a transmit-antenna diversity arrangement 600 that also requires no T/R switch. It uses only two antennas 601 and 602 in another alternative embodiment of the present invention. A transmit-diversity switch 604 multiplexes the two antennas to a power amplifier 606. The antenna 602 alone is connected to a low-noise amplifier (LNA) 608.

The antenna diversity described herein maybe applied in a transceiver at the receiver, at the transmitter, or both.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method of operating a wireless station of a wireless network, the wireless station including a receive path with a first stage of radio frequency amplification, the method comprising the steps of:

separating radio transmission signals for transmission and reception signals received into corresponding one or more transmitter antennas and signals from corresponding one or more receiving antennas;

providing at least three antennas including at least two transmitter antennas and at least one receive antenna, or including at least two receiver antennas and at least one transmit antenna, such there is transmit and/or receive diversity without a transmit/receive switch; and multiplexing between said at least two receive antennas with a receiver diversity switch and/or between said at least two transmit antennas with a transmitter diversity switch;

wherein a transmit/receive switch and its concomitant signal insertion loss is eliminated from a path between an antenna receiving wireless local area network transmission signals and a first stage of radio-frequency amplification.

2. A method as recited in claim 1, wherein the providing provides at least two receiver antennas and at least one transmitter antenna, such that the wireless station includes at least two receiver antennas and at least one transmitter antenna and is configured to operate with diversity for reception, the method further comprising receiving via one of the receiver antennas selected according to radio signal quality.

3. A method as recited in claim 2, further comprising switching to a first low noise receiving amplifier coupled to the one selected receiving antenna from a second low noise receiving amplifier coupled to another one of the receiver antennas.

4. A method as recited in claim 1, wherein the providing provides at least two transmitter antennas and at least two receiver antenna, such that the wireless station includes at least two receiver antennas and at least two transmitter antennas and is configured to operate with diversity for transmission by selecting one of the transmitter antennas according to a response to the wireless station transmitting a test transmission and to operate with diversity for reception by selecting one of the receiver antennas according to radio signal quality.

5. A method as recited in claim 1, wherein the transmission and reception signals are OFDM signals.

6. A method as recited in claim 1, wherein the providing provides at least two transmitter antennas and at least one receiver antenna, such that the wireless station includes at least two transmitter antennas and at least one receiver antenna and is configured to operate with diversity for transmission, the method further comprising transmitting via one of the transmitter antennas selected according to a response to the wireless station transmitting a test transmission.

7. A method as recited in claim 6, further comprising switching power to a first power amplifier coupled to the one selected transmitter antenna from a second power amplifier coupled to another one of the transmitter antennas.

8. A method of operating a wireless station of a wireless network, the wireless station including a receive path with a first stage of radio frequency amplification, the method comprising the steps of:
    separating radio transmission signals for transmission and reception signals received into corresponding one or more transmitter antennas and signals from corresponding one or more receiving antennas;
    providing at least three antennas including at least two transmitter antennas and at least one receive antenna, or including at least two receiver antennas and at least one transmit antenna, such there is transmit and/or receive diversity without a transmit/receive switch; and
    multiplexing between said at least two receive antennas with a receiver diversity switch and/or between said at least two transmit antennas with a transmitter diversity switch;
    wherein, a multi-pole bandpass filter for said radio transmission signals and its concomitant signal insertion loss is eliminated from a path between an antenna receiving wireless local area network transmission signals and a first stage of radio-frequency amplification.

9. A method operating a wireless station of a wireless network, the wireless station including a receive path with a first stage of radio frequency amplification, the method comprising the steps of:
    separating radio transmission signals for transmission and reception signals received into corresponding one or more transmitter antennas and signals from corresponding one or more receiving antennas;
    providing at least three antennas including at least two transmitter antennas and at least one receive antenna, or including at least two receiver antennas and at least one transmit antenna, such there is transmit and/or receive diversity without a transmit/receive switch; and
    multiplexing between said at least two receive antennas with a receiver diversity switch and/or between said at least two transmit antennas with a transmitter diversity switch;
    wherein, a first stage of radio-frequency amplification is placed in a path after an antenna receiving wireless local area network transmission signals and before a simple bandpass filter for said radio reception signals and its concomitant signal insertion loss.

10. A method of operating a wireless station of a wireless network, the wireless station including a receive path with a first stage of radio frequency amplification, the method comprising the steps of:
    separating radio transmission signals for transmission and reception signals received into corresponding one or more transmitter antennas and signals from corresponding one or more receiving antennas;
    providing at least three antennas including at least two transmitter antennas and at least one receive antenna, or including at least two receiver antennas and at least one transmit antenna, such there is transmit and/or receive diversity without a transmit/receive switch; and
    multiplexing between said at least two receive antennas with a receiver diversity switch and/or between said at least two transmit antennas with a transmitter diversity switch;
    wherein, a transmit/receive switch and its concomitant signal insertion loss is eliminated from a path between an antenna receiving wireless local area network transmission signals an a first stage of radio-frequency amplification;
    wherein, a multi-pole bandpass filter for said radio transmission signals and its concomitant signal insertion loss is eliminated from a path between an antenna receiving wireless local area network transmission signals and a first stage of radio-frequency amplification; and
    wherein, a first stage of radio-frequency amplification is placed in a path after an antenna receiving wireless local area network transmission signals and before a simple bandpass filter for said radio reception signals and its concomitant signal insertion loss.

11. A means for increasing the available radio signal in a wireless local area network, comprising:
    means for separating radio transmission signals for transmission and reception signals received into corresponding one or more transmitter antennas and signals from corresponding one or more receiving antennas;
    at least three antennas including at least two transmitter antennas and at least one receive antenna, or including at least two receiver antennas and at least one transmit antenna, such there is transmit and/or receive diversity without a transmit/receive switch; and
    means for multiplexing between said at least two receive antennas with a receiver diversity switch and/or between said at least two transmit antennas with a transmitter diversity switch;
    wherein, a multi-pole bandpass filter for said radio transmission signals and its concomitant signal insertion loss is eliminated from a path between an antenna receiving wireless local area network transmission signals and a first stage of radio-frequency amplification.

12. A means for increasing the available radio signal in a wireless local area network, comprising:
    means for separating radio transmission signals for transmission and reception signals received into corresponding one or more transmitter antennas and signals from corresponding one or more receiving antennas;
    at least three antennas including at least two transmitter antennas and at least one receive antenna, or including at least two receiver antennas and at least one transmit antenna, such there is transmit and/or receive diversity without a transmit/receive switch; and
    means for multiplexing between said at least two receive antennas with a receiver diversity switch and/or between said at least two transmit antennas with a transmitter diversity switch;

wherein, a first stage of radio-frequency amplification is placed in a path after an antenna receiving wireless local area network transmission signals and before a simple bandpass filter for said radio reception signals and its concomitant signal insertion loss.

13. A means for increasing the available radio signal in a wireless local area network, the means for increasing the available radio signal comprising:
  means for separating radio transmission signals for transmission and reception signals received into corresponding one or more transmitter antennas and signals from corresponding one or more receiving antennas;
  at least three antennas including at least two transmitter antennas and at least one receive antenna, or including at least two receiver antennas and at least one transmit antenna, such there is transmit and/or receive diversity without a transmit/receive switch; and
  means for multiplexing between said at least two receive antennas with a receiver diversity switch and/or between said at least two transmit antennas with a transmitter diversity switch;
  wherein, a transmit/receive switch and its concomitant signal insertion loss is eliminated from a path between an antenna receiving wireless local area network transmission signals an a first stage of radio-frequency amplification;
  wherein, a multi-pole bandpass filter for said radio transmission signals and its concomitant signal insertion loss is eliminated from a path between an antenna receiving wireless local area network transmission signals and a first stage of radio-frequency amplification; and
  wherein, a first stage of radio-frequency amplification is placed in a path after an antenna receiving wireless local area network transmission signals and before a simple bandpass filter for said radio reception signals and its concomitant signal insertion loss.

14. A means for increasing the available radio signal in a wireles local area network, comprising:
  means for separating radio transmission signals for transmission and reception signals received into corresponding one or more transmitter antennas and signals from corresponding one or more receiving antennas;
  at least three antennas including at least two transmitter antennas and at least one receive antenna, or including at least two receiver antennas and at least one transmit antenna, such there is transmit and/or receive diversity without a transmit/receive switch; and
  means for multiplexing between said at least two receive antennas with a receiver diversity switch and/or between said at least two transmit antennas with a transmitter diversity switch;
  wherein a transmit/receive switch and its concomitant signal insertion loss is eliminated from a path between an antenna receiving wireless local area network transmission signals and a first stage of radio-frequency amplification.

15. A means for increasing the available radio signal as recited in claim 14, wherein the at least two transmitter antennas and/or at least two receiver antennas include at least two transmitter antennas and at least one receiver antenna, such that the means for increasing the available radio signal can operate with diversity for transmission, the means for increasing the available radio signal further comprising,
  means for selecting one of the transmitter antennas for transmission according to a response to the means for increasing the available radio signal's transmitting a test transmission; and
  means for transmitting via the one transmitter antenna selected by the means for selecting.

16. A means for increasing the available radio signal as recited in claim 15, further comprising means for switching power to a first power amplifier coupled to the one transmitter antenna selected by the means for selecting from a second power amplifier coupled to another one of the transmitter antennas.

17. A means for increasing the available radio signal as recited in claim 5, wherein the at least two transmitter antennas and/or at least two receiver antennas include at least two receiver antennas and at least one transmitter antenna, such that the means for increasing the available radio signal can operate with diversity for reception, the means for increasing the available radio signal further comprising
  means for selecting one of the receiver antennas for receiving according to radio signal quality; and
  means for receiving via the one receiver antenna selected by the means for selecting.

18. A means for increasing the available radio signal as recited in claim 17, wherein the means for selecting includes means for switching to a first low noise receiving amplifier coupled to the one selected receiving antenna from a second low noise receiving amplifier coupled to another one of the receiver antennas.

19. A means for increasing the available radio signal as recited in claim 14, wherein the at least two transmitter antennas and/or at least two receiver antennas include at least two transmitter antennas and at least two receiver antennas, such that the means for increasing the available radio signal can operate with diversity for transmission and diversity for reception, the means for increasing the available radio signal farther comprising,
  means for selecting one of the transmitter antennas for transmission according to a response to the means for increasing the available radio signal's transmitting a test transmission;
  means for transmitting via the one transmitter antenna selected by the means for selecting one of the transmitter antennas;
  means for selecting one of the receiver antennas for receiving according to radio signal quality; and
  means for receiving via the one receiver antenna selected by the means for selecting one of the receiver antennas.

20. A means for increasing the available radio signal as recited in claim 14, wherein the transmission and reception signals are OFDM signals.

* * * * *

UNITED STATES PATENT AND TRADEMARK OFFICE
CERTIFICATE OF CORRECTION

| | |
|---|---|
| PATENT NO. | : 7,636,344 B2 |
| APPLICATION NO. | : 11/421204 |
| DATED | : December 22, 2009 |
| INVENTOR(S) | : O'Sullivan et al. |

It is certified that error appears in the above-identified patent and that said Letters Patent is hereby corrected as shown below:

In column 10, line 19, kindly change "claim 5" to --claim 14--

Signed and Sealed this

Sixth Day of April, 2010

David J. Kappos
*Director of the United States Patent and Trademark Office*